United States Patent
Swaminathan et al.

(10) Patent No.: US 11,762,634 B2
(45) Date of Patent: Sep. 19, 2023

(54) SYSTEMS AND METHODS FOR SEAMLESSLY INTEGRATING MULTIPLE PRODUCTS BY USING A COMMON VISUAL MODELER

(71) Applicant: ASG Technologies Group, Inc., Waltham, MA (US)

(72) Inventors: Vignesh Swaminathan, Hyderabad (IN); Sathish Kumar Thangaraj, Hyderabad (IN); Venkatesh Maringanti, Hyderabad (IN); Krishnachandiran Ravichandiran, Hyderabad (IN); Narayanaswamy Viswanathan, Plano, TX (US)

(73) Assignee: ASG Technologies Group, Inc., Waltham, MA (US)

( * ) Notice: Subject to any disclaimer, the term of this patent is extended or adjusted under 35 U.S.C. 154(b) by 0 days.

(21) Appl. No.: 16/456,599

(22) Filed: Jun. 28, 2019

(65) Prior Publication Data
US 2020/0409665 A1 Dec. 31, 2020

(51) Int. Cl.
*G06F 8/20* (2018.01)
*G06F 8/34* (2018.01)
*G06F 8/35* (2018.01)

(52) U.S. Cl.
CPC .......... *G06F 8/20* (2013.01); *G06F 8/34* (2013.01); *G06F 8/35* (2013.01)

(58) Field of Classification Search
CPC .......... G06F 8/20; G06F 8/34; G06F 8/35
See application file for complete search history.

(56) References Cited

U.S. PATENT DOCUMENTS

| 5,321,610 A | * | 6/1994 | Breslin ............. G06Q 10/10 |
| | | | 705/7.17 |
| 5,528,263 A | | 6/1996 | Platzker et al. |

(Continued)

FOREIGN PATENT DOCUMENTS

| EP | 3296866 A1 | 3/2018 |
| EP | 3430529 A1 | 1/2019 |

(Continued)

OTHER PUBLICATIONS

"International Search Report" and "Written Opinion of the International Searching Authority," Patent Cooperation Treaty Application No. PCT/US2017/022295, dated Jun. 1, 2017, 9 pages.

(Continued)

*Primary Examiner* — Adam Lee
(74) *Attorney, Agent, or Firm* — Carr & Ferrell LLP

(57) ABSTRACT

Provided are methods and systems for enabling seamless integration between multiple products as a common layer by using a common visual modeler. An example system may include an application server and a common visual modeler. The common visual modeler may include a visual modeling environment for building an application by an end user. The visual modeling environment may include a modeler for creating the application, wherein the modeler comprises at least one component from at least one enterprise software product, the at least one component comprising at least one UI-based modeling tool for creating at least one artifact and a configuration module for managing settings of the at least one component. The common visual modeler may also include a server runtime environment for executing the application, the server runtime environment comprising at least one runtime engine for the at least one artifact created by the modeler.

20 Claims, 9 Drawing Sheets

(56) References Cited

U.S. PATENT DOCUMENTS

| | | | |
|---|---|---|---|
| 5,742,285 A | 4/1998 | Ueda | |
| 6,069,957 A | 5/2000 | Richards | |
| 6,208,345 B1 | 3/2001 | Sheard et al. | |
| 6,331,855 B1 | 12/2001 | Schauser | |
| 6,574,321 B1* | 6/2003 | Cox | H04M 3/36 |
| | | | 379/189 |
| 6,597,363 B1 | 7/2003 | Duluk | |
| 6,950,825 B2 | 9/2005 | Chang et al. | |
| 7,073,164 B1* | 7/2006 | Knowles | G06F 8/10 |
| | | | 717/102 |
| 7,359,076 B2 | 4/2008 | Uchino | |
| 7,937,665 B1 | 5/2011 | Vazquez et al. | |
| 8,078,731 B1* | 12/2011 | Bruder | H04L 67/2823 |
| | | | 709/227 |
| 8,468,491 B2 | 6/2013 | Markovic | |
| 8,667,456 B1 | 3/2014 | Czymontek | |
| 8,745,011 B2 | 6/2014 | Kishi | |
| 9,032,076 B2 | 5/2015 | Buehler et al. | |
| 9,053,295 B1 | 6/2015 | Wick et al. | |
| 9,213,707 B2 | 12/2015 | Conner | |
| 9,232,491 B2 | 1/2016 | Mahaffey | |
| 9,483,537 B1 | 11/2016 | Peters et al. | |
| 9,621,428 B1* | 4/2017 | Lev | H04L 41/12 |
| 9,910,655 B1* | 3/2018 | Ranganathan | G06F 21/6245 |
| 10,162,624 B1 | 12/2018 | Moturu et al. | |
| 10,181,059 B1* | 1/2019 | Brewton | G06F 8/20 |
| 10,318,762 B1 | 6/2019 | Buckingham et al. | |
| 10,348,505 B1 | 7/2019 | Crawforth et al. | |
| 10,355,864 B2 | 7/2019 | Konduru | |
| 10,812,611 B2 | 10/2020 | Bennet et al. | |
| 10,877,740 B2 | 12/2020 | Bennet et al. | |
| 11,055,067 B2 | 7/2021 | Thangaraj et al. | |
| 11,057,500 B2 | 7/2021 | Aragón et al. | |
| 11,086,751 B2 | 8/2021 | Moresmau et al. | |
| 11,172,042 B2 | 11/2021 | Bennet et al. | |
| 2002/0067373 A1* | 6/2002 | Roe | G06T 17/05 |
| | | | 715/762 |
| 2002/0099952 A1 | 7/2002 | Lambert et al. | |
| 2002/0103731 A1* | 8/2002 | Barnard | G06Q 10/06375 |
| | | | 705/34 |
| 2002/0184610 A1 | 12/2002 | Chong et al. | |
| 2002/0196277 A1* | 12/2002 | Bushey | G06Q 10/10 |
| | | | 715/745 |
| 2003/0046401 A1 | 3/2003 | Abbott et al. | |
| 2003/0079052 A1 | 4/2003 | Kushnirskiy | |
| 2004/0003119 A1 | 1/2004 | Munir et al. | |
| 2004/0003371 A1 | 1/2004 | Coulthard et al. | |
| 2004/0078373 A1 | 4/2004 | Ghoneimy et al. | |
| 2004/0128001 A1 | 7/2004 | Levin et al. | |
| 2004/0153994 A1 | 8/2004 | Bates et al. | |
| 2004/0177323 A1 | 9/2004 | Kaasila et al. | |
| 2004/0267749 A1* | 12/2004 | Bhat | G06F 21/6218 |
| 2005/0038764 A1* | 2/2005 | Minsky | G06Q 10/06375 |
| | | | 706/47 |
| 2005/0065845 A1 | 3/2005 | DeAngelis | |
| 2005/0235258 A1 | 10/2005 | Wason | |
| 2005/0278695 A1 | 12/2005 | Synovic | |
| 2006/0026591 A1* | 2/2006 | Backhouse | G06F 8/60 |
| | | | 717/177 |
| 2006/0031854 A1 | 2/2006 | Godwin | |
| 2006/0036448 A1* | 2/2006 | Haynie | G06Q 10/10 |
| | | | 705/37 |
| 2006/0036941 A1 | 2/2006 | Neil | |
| 2006/0039466 A1 | 2/2006 | Emerson et al. | |
| 2006/0111888 A1 | 5/2006 | Hiew et al. | |
| 2006/0184925 A1 | 8/2006 | Ficatier et al. | |
| 2006/0251047 A1 | 11/2006 | Shenfield et al. | |
| 2006/0265719 A1* | 11/2006 | Astl | G06F 9/547 |
| | | | 719/328 |
| 2006/0271528 A1 | 11/2006 | Gorelik | |
| 2007/0016624 A1 | 1/2007 | Powers et al. | |
| 2007/0028286 A1 | 2/2007 | Greene et al. | |
| 2007/0033637 A1 | 2/2007 | Yami et al. | |
| 2007/0073671 A1 | 3/2007 | McVeigh et al. | |
| 2007/0094594 A1 | 4/2007 | Matichuk | |
| 2007/0135936 A1* | 6/2007 | Dumas | G06F 8/10 |
| | | | 700/29 |
| 2007/0156764 A1 | 7/2007 | O'Connell et al. | |
| 2007/0180444 A1 | 8/2007 | Hoover et al. | |
| 2007/0198450 A1 | 8/2007 | Khalsa | |
| 2007/0208685 A1 | 9/2007 | Blumenau | |
| 2007/0266394 A1* | 11/2007 | Odent | G06Q 10/06 |
| | | | 719/316 |
| 2007/0294406 A1* | 12/2007 | Suer | G06Q 10/06 |
| | | | 709/226 |
| 2008/0109292 A1* | 5/2008 | Moore | G06Q 10/06 |
| | | | 715/728 |
| 2008/0126932 A1* | 5/2008 | Elad | G06F 9/453 |
| | | | 715/705 |
| 2008/0141141 A1* | 6/2008 | Moore | G06F 9/451 |
| | | | 715/748 |
| 2008/0189617 A1 | 8/2008 | Covell et al. | |
| 2008/0209390 A1 | 8/2008 | Dutta et al. | |
| 2008/0229303 A1* | 9/2008 | Carteri | G06F 8/61 |
| | | | 717/177 |
| 2008/0281727 A1* | 11/2008 | Moss | G06Q 30/00 |
| | | | 705/313 |
| 2009/0024660 A1* | 1/2009 | Borgsmidt | G06F 16/283 |
| 2009/0025063 A1 | 1/2009 | Thomas | |
| 2009/0083306 A1 | 3/2009 | Sichi et al. | |
| 2009/0094112 A1* | 4/2009 | Cesarini | H04L 12/1457 |
| | | | 705/14.36 |
| 2009/0124387 A1 | 5/2009 | Perlman et al. | |
| 2009/0249290 A1 | 10/2009 | Jenkins et al. | |
| 2009/0249446 A1* | 10/2009 | Jenkins | G06F 16/93 |
| | | | 726/3 |
| 2010/0106560 A1 | 4/2010 | Li et al. | |
| 2010/0114628 A1 | 5/2010 | Adler et al. | |
| 2010/0131857 A1 | 5/2010 | Prigge | |
| 2010/0153866 A1* | 6/2010 | Sharoni | G06F 9/452 |
| | | | 715/762 |
| 2010/0169265 A1 | 7/2010 | Ristock et al. | |
| 2010/0225658 A1 | 9/2010 | Coleman | |
| 2010/0226441 A1 | 9/2010 | Tung et al. | |
| 2010/0231599 A1 | 9/2010 | Tung et al. | |
| 2010/0245563 A1 | 9/2010 | Golovchinsky et al. | |
| 2010/0250497 A1 | 9/2010 | Redlich et al. | |
| 2010/0274815 A1 | 10/2010 | Vanasco | |
| 2011/0004564 A1* | 1/2011 | Rolia | G06Q 10/067 |
| | | | 705/348 |
| 2011/0029947 A1* | 2/2011 | Markovic | G06Q 10/10 |
| | | | 717/102 |
| 2011/0078708 A1 | 3/2011 | Dokovski et al. | |
| 2011/0107298 A1 | 5/2011 | Sebastian | |
| 2011/0107309 A1 | 5/2011 | Baron | |
| 2011/0107313 A1 | 5/2011 | Baron | |
| 2011/0246904 A1 | 10/2011 | Pinto et al. | |
| 2011/0276636 A1* | 11/2011 | Cheng | H04L 69/14 |
| | | | 709/206 |
| 2012/0072509 A1* | 3/2012 | Booth | G06F 9/541 |
| | | | 709/206 |
| 2012/0075333 A1 | 3/2012 | Chen et al. | |
| 2012/0110487 A1* | 5/2012 | Kudikala | G06F 8/10 |
| | | | 715/771 |
| 2012/0130906 A1* | 5/2012 | Klinker | G06Q 10/103 |
| | | | 705/301 |
| 2012/0310381 A1* | 12/2012 | Karaffa | G05B 19/418 |
| | | | 700/80 |
| 2012/0310875 A1 | 12/2012 | Prahlad et al. | |
| 2012/0324358 A1 | 12/2012 | Jooste | |
| 2012/0331527 A1 | 12/2012 | Walters et al. | |
| 2013/0031158 A1* | 1/2013 | Salsburg | G06F 9/5072 |
| | | | 709/203 |
| 2013/0117662 A1 | 5/2013 | Shan et al. | |
| 2013/0151557 A1 | 6/2013 | Shanken et al. | |
| 2013/0174028 A1 | 7/2013 | Grossman et al. | |
| 2013/0275475 A1* | 10/2013 | Ahlborn | G06Q 10/0633 |
| | | | 707/812 |
| 2013/0332423 A1 | 12/2013 | Puri et al. | |
| 2013/0339872 A1* | 12/2013 | Shuster | G09G 5/377 |
| | | | 715/746 |

(56) References Cited

U.S. PATENT DOCUMENTS

| | | | |
|---|---|---|---|
| 2014/0026113 A1* | 1/2014 | Farooqi | G06F 8/36 717/107 |
| 2014/0032875 A1 | 1/2014 | Butler | |
| 2014/0047011 A1 | 2/2014 | Lahav et al. | |
| 2014/0047413 A1 | 2/2014 | Sheive et al. | |
| 2014/0075407 A1* | 3/2014 | Donis | G06F 8/70 717/102 |
| 2014/0089388 A1 | 3/2014 | Curry et al. | |
| 2014/0114907 A1 | 4/2014 | Kozina et al. | |
| 2014/0114962 A1 | 4/2014 | Rosenburg et al. | |
| 2014/0207575 A1* | 7/2014 | Freed-Finnegan | G06Q 30/0641 705/14.58 |
| 2014/0245199 A1* | 8/2014 | Belotti | G06F 9/44505 715/762 |
| 2014/0282453 A1 | 9/2014 | O'Rourke et al. | |
| 2014/0288923 A1* | 9/2014 | Marian | G06F 40/242 704/10 |
| 2014/0288945 A1* | 9/2014 | Boerner | G06Q 40/08 705/2 |
| 2014/0380105 A1* | 12/2014 | Michel | G06F 11/0709 714/57 |
| 2015/0006543 A1* | 1/2015 | Jin | G06F 16/21 707/748 |
| 2015/0012478 A1 | 1/2015 | Mohammad et al. | |
| 2015/0046930 A1* | 2/2015 | Phadke | G06F 9/54 719/313 |
| 2015/0088933 A1 | 3/2015 | Schofield et al. | |
| 2015/0127660 A1 | 5/2015 | Zilberberg et al. | |
| 2015/0128105 A1 | 5/2015 | Sethi et al. | |
| 2015/0248280 A1* | 9/2015 | Pillay | G06F 8/41 717/106 |
| 2015/0293764 A1 | 10/2015 | Visvanathan | |
| 2015/0379303 A1 | 12/2015 | LaFever et al. | |
| 2016/0026968 A1* | 1/2016 | Fan | G06Q 10/087 707/769 |
| 2016/0034260 A1* | 2/2016 | Ristock | G06F 9/453 717/109 |
| 2016/0034571 A1* | 2/2016 | Setayesh | G06F 16/353 707/738 |
| 2016/0044380 A1 | 2/2016 | Barrett | |
| 2016/0070541 A1 | 3/2016 | Lee et al. | |
| 2016/0117159 A1 | 4/2016 | Balko | |
| 2016/0140204 A1 | 5/2016 | Brown et al. | |
| 2016/0253340 A1 | 9/2016 | Barth et al. | |
| 2016/0267060 A1 | 9/2016 | Skirpa et al. | |
| 2016/0267082 A1 | 9/2016 | Wong et al. | |
| 2016/0275439 A1 | 9/2016 | Avats | |
| 2016/0283200 A1 | 9/2016 | Standley et al. | |
| 2016/0299933 A1* | 10/2016 | Fillipi | G06F 16/24565 |
| 2016/0359711 A1 | 12/2016 | Deen et al. | |
| 2017/0034306 A1 | 2/2017 | Thangeswaran | |
| 2017/0039041 A1 | 2/2017 | Bommireddi | |
| 2017/0068395 A1 | 3/2017 | Massoudi | |
| 2017/0118284 A1* | 4/2017 | Chen | H04L 67/34 |
| 2017/0123751 A1 | 5/2017 | Sigurdsson et al. | |
| 2017/0154026 A1* | 6/2017 | Gong | G06T 11/206 |
| 2017/0180284 A1 | 6/2017 | Smullen et al. | |
| 2017/0199936 A1 | 7/2017 | Steelberg et al. | |
| 2017/0228119 A1 | 8/2017 | Hosbettu et al. | |
| 2017/0269972 A1 | 9/2017 | Hosabettu et al. | |
| 2017/0270022 A1 | 9/2017 | Moresmau et al. | |
| 2017/0339564 A1 | 11/2017 | Momchilov et al. | |
| 2017/0344227 A1 | 11/2017 | Stoicov et al. | |
| 2017/0357814 A1 | 12/2017 | Mahaffey et al. | |
| 2018/0081668 A1* | 3/2018 | Eberlein | G06F 8/70 |
| 2018/0089005 A1* | 3/2018 | Green | G06F 9/547 |
| 2018/0121841 A1* | 5/2018 | Harris | G06Q 10/067 |
| 2018/0129497 A1 | 5/2018 | Biddle et al. | |
| 2018/0167426 A1 | 6/2018 | Sigurdsson et al. | |
| 2018/0173510 A1* | 6/2018 | Koshkin | G06Q 10/06313 |
| 2018/0174104 A1* | 6/2018 | Schikora | G06F 16/248 |
| 2018/0191761 A1 | 7/2018 | Lee et al. | |
| 2018/0197123 A1 | 7/2018 | Parimelazhagan et al. | |
| 2018/0322396 A1 | 11/2018 | Ahuja-Cogny et al. | |
| 2018/0367506 A1 | 12/2018 | Ford et al. | |
| 2019/0081935 A1 | 3/2019 | Broussard et al. | |
| 2019/0129734 A1 | 5/2019 | Yang et al. | |
| 2019/0158630 A1 | 5/2019 | Aragón et al. | |
| 2019/0196793 A1* | 6/2019 | Jaiprakash | G06F 8/38 |
| 2019/0205111 A1 | 7/2019 | Bennet et al. | |
| 2019/0208031 A1 | 7/2019 | Bennet et al. | |
| 2019/0238467 A1 | 8/2019 | Guan et al. | |
| 2019/0238688 A1 | 8/2019 | Bermundo et al. | |
| 2019/0243742 A1* | 8/2019 | Natari | G06F 11/3608 |
| 2019/0332357 A1* | 10/2019 | Reddy | G06F 9/54 |
| 2019/0342404 A1 | 11/2019 | Kundu et al. | |
| 2019/0369969 A1 | 12/2019 | Donohoe et al. | |
| 2020/0042648 A1 | 2/2020 | Rao | |
| 2020/0050983 A1 | 2/2020 | Balasubramanian et al. | |
| 2020/0133982 A1 | 4/2020 | Thangeswaran et al. | |
| 2020/0348964 A1 | 11/2020 | Anand et al. | |
| 2020/0356365 A1 | 11/2020 | Pezaris | |
| 2020/0409665 A1 | 12/2020 | Swaminathan et al. | |
| 2021/0019574 A1 | 1/2021 | Voicu | |
| 2021/0037110 A1 | 2/2021 | Bennet et al. | |
| 2021/0092154 A1 | 3/2021 | Kumar et al. | |
| 2021/0107164 A1 | 4/2021 | Singh et al. | |
| 2021/0109503 A1 | 4/2021 | Singh et al. | |
| 2021/0109742 A1 | 4/2021 | Bennet et al. | |
| 2021/0110345 A1 | 4/2021 | Iyer et al. | |
| 2021/0117162 A1 | 4/2021 | Thangaraj et al. | |
| 2021/0117210 A1 | 4/2021 | Yueh | |
| 2021/0117302 A1 | 4/2021 | Kadakia et al. | |
| 2021/0117394 A1 | 4/2021 | Moresmau et al. | |
| 2021/0117517 A1 | 4/2021 | Bregman et al. | |
| 2021/0117562 A1 | 4/2021 | Balan et al. | |
| 2021/0117563 A1 | 4/2021 | Moresmau et al. | |
| 2021/0117895 A1 | 4/2021 | Tondevold et al. | |
| 2021/0120044 A1 | 4/2021 | Balan et al. | |
| 2021/0194994 A1 | 6/2021 | Aragón et al. | |
| 2021/0286597 A1 | 9/2021 | Thangaraj et al. | |
| 2021/0357503 A1 | 11/2021 | Moresmau et al. | |

FOREIGN PATENT DOCUMENTS

| | | |
|---|---|---|
| EP | 3714604 A1 | 9/2020 |
| EP | 3732566 | 11/2020 |
| EP | 3732582 | 11/2020 |
| WO | WO2008003593 A1 | 1/2008 |
| WO | WO2015139119 A1 | 9/2015 |
| WO | WO2015154133 A1 | 10/2015 |
| WO | WO2017147694 A1 | 9/2017 |
| WO | WO2017160831 A1 | 9/2017 |
| WO | WO2019099140 A1 | 5/2019 |
| WO | WO2019133208 A1 | 7/2019 |
| WO | WO2019133209 A1 | 7/2019 |
| WO | WO2020263573 A1 | 12/2020 |
| WO | WO2021076310 A1 | 4/2021 |
| WO | WO2021076311 A1 | 4/2021 |
| WO | WO2021076312 A1 | 4/2021 |
| WO | WO2021076324 A1 | 4/2021 |
| WO | WO2021076520 A1 | 4/2021 |
| WO | WO2021076521 A1 | 4/2021 |
| WO | WO2021076791 A1 | 4/2021 |
| WO | WO2021076921 A1 | 4/2021 |

OTHER PUBLICATIONS

"International Search Report" and "Written Opinion of the International Searching Authority," Patent Cooperation Treaty Application No. PCT/US2018/056196, dated Dec. 26, 2018, 8 pages.

"International Search Report" and "Written Opinion of the International Searching Authority," Patent Cooperation Treaty Application No. PCT/US2018/064127, dated Feb. 11, 2019, 6 pages.

"International Search Report" and "Written Opinion of the International Searching Authority," Patent Cooperation Treaty Application No. PCT/US2018/064122, dated Mar. 18, 2019, 8 pages.

"Extended European Search Report" and "Written Opinion", European Application No. 17767331.6, dated Nov. 14, 2019, 6 pages.

(56) References Cited

OTHER PUBLICATIONS

"International Search Report" and "Written Opinion of the International Searching Authority," Patent Cooperation Treaty Application No. PCT/US2020/037028, dated Aug. 28, 2020, 13 pages.
"International Search Report" and "Written Opinion of the International Searching Authority," Patent Cooperation Treaty Application No. PCT/US2020/053141, dated Jan. 12, 2021, 8 pages.
"International Search Report" and "Written Opinion of the International Searching Authority," Patent Cooperation Treaty Application No. PCT/US2020/053419, dated Jan. 14, 2021, 14 pages.
"International Search Report" and "Written Opinion of the International Searching Authority," Patent Cooperation Treaty Application No. PCT/US2020/053138, dated Jan. 12, 2021, 8 pages.
"International Search Report" and "Written Opinion of the International Searching Authority," Patent Cooperation Treaty Application No. PCT/US2020/053139, dated Jan. 11, 2021, 8 pages.
"International Search Report" and "Written Opinion of the International Searching Authority," Patent Cooperation Treaty Application No. PCT/US2020/056026, dated Jan. 19, 2021, 16 pages.
"International Search Report" and "Written Opinion of the International Searching Authority," Patent Cooperation Treaty Application No. PCT/US2020/055829, dated Jan. 19, 2021, 18 pages.
"International Search Report" and "Written Opinion of the International Searching Authority," Patent Cooperation Treaty Application No. PCT/US2020/055418, dated Jan. 28, 2021, 8 pages.
"International Search Report" and "Written Opinion of the International Searching Authority," Patent Cooperation Treaty Application No. PCT/US2020/055420, dated Feb. 1, 2021, 8 pages.
Bourgouin et al., "Towards a Process Analysis Approach to Adopt Robotic Process Automation", IEEE, 2018, 8 pages.
"Extended European Search Report" and "Written Opinion", European Application No. 18879227.9, dated Mar. 15, 2021, 9 pages.
"Extended European Search Report" and "Written Opinion", European Application No. 18895108.1, dated Aug. 19, 2021, 8 pages.
"Extended European Search Report" and "Written Opinion", European Application No. 18895245.1, dated Aug. 25, 2021, 8 pages.
"International Search Report" and "Written Opinion of the International Searching Authority," Patent Cooperation Treaty Application No. PCT/US2021/054415, dated Jan. 19, 2022, 8 pages.
Kuligowski, Kiely; "What Is a Document Repository?" business.com. [Retrieved on Dec. 12, 2021]; <URL: https://www.business.com/articles/what-is-document-repository/>, Jun. 25, 2020, 10 pages.
"International Search Report" and "Written Opinion of the International Searching Auihority," Patent Cooperation Treaty Application No. PCT/US2021/054416; dated Jan. 19, 2022, 9 pages.

* cited by examiner

SYSTEMS AND METHODS FOR SEAMLESSLY INTEGRATING MULTIPLE PRODUCTS BY USING A COMMON VISUAL MODELER

FIELD

This application relates generally to data integration and, more specifically, to systems and methods for enabling seamless integration of multiple products as a common layer by using a common visual modeler.

BACKGROUND

Enterprise software products serve the various business needs of companies and businesses such as customer resource management, payroll, accounting and human resource functions, data management and intelligence, and other business processes. These enterprise products generally have implementation and integration requirements from configuration to complex implementations, customizations, or integrations. These products also contain capabilities such as various configuration user interfaces and software development kits (SDKs) which implementation partners or customers use for implementation and integrations.

Commonly, companies and businesses are using multiple products from a single product vendor or multiple product vendors which can cause more complex and time-consuming implementations and integrations, increased project costs, and a lack of seamless experience for the customer (i.e., a company or a business). For example, a customer may require a product vendor to build an application that spans across multiple products where configuration and/or integration of these multiple products is difficult. Increased complexity may result from redundant or inconsistent configuration, integration of components from different products, and other reasons.

Although the enterprise software landscape has moved towards visual modeling-based development involving low to zero coding in order to satisfy the widening user base for software implementation and integration, multiple products still pose serious challenges and constraints to the modeling environment.

Embodiments of the present disclosure provide a common visual modeling environment that provides a framework for product vendors to plug in different product lines that ensures consistency across products, reduces development, implementation, and integration costs, provides flexibility, and requires little to no coding.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems for enabling seamless integration of multiple products as a common layer by using a common visual modeler. In some embodiments, a system for seamlessly integrating multiple products as a common layer may include an application server and a common visual modeler. The common visual modeler may include a visual modeling environment for building an application by an end user. The visual modeling environment may include a modeler for creating the application, wherein the modeler comprises at least one component from at least one enterprise software product, the at least one component comprising at least one UI-based modeling tool for creating at least one artifact and a configuration module for managing settings of the at least one component. The common visual modeler may also include a server runtime environment for executing the application, the server runtime environment comprising at least one runtime engine for the at least one artifact created by the modeler.

In some example embodiments, a method for seamlessly integrating multiple products as a common layer by using a common visual modeler may include selecting at least one enterprise software product comprising at least one component. The method may further include loading the at least one component into a common visual modeler. The method may further include building, by an end user, at least one application in a visual modeling environment of the common visual modeler. The method may include executing the at least one application in a server runtime environment for at least one artifact created by the modeler Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Exemplary embodiments are illustrated by way of example and not limitation in the figures of the accompanying drawings, in which like references indicate similar elements.

DETAILED DESCRIPTION

Figure 1:
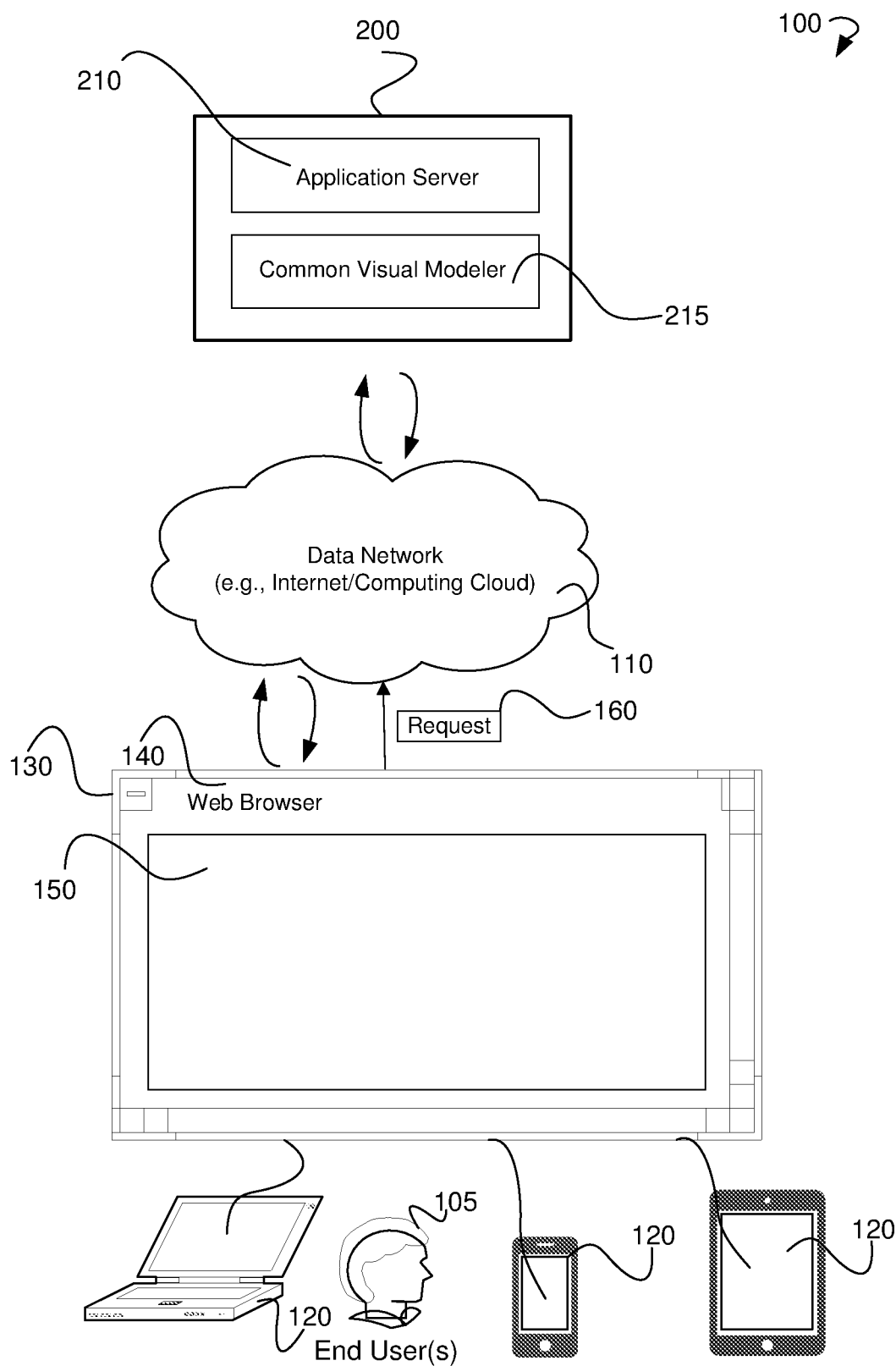
FIG. 1 illustrates an environment within which methods and systems for seamlessly integrating multiple products as a common layer by using a common visual modeler can be implemented, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Typically, providers and vendors of enterprise solutions have multiple product lines, and these product lines may serve different business purposes, but the end customers (i.e., companies and businesses) could be the same. A customer may be buying multiple solutions from the same solution provider or a customer buying solutions from different solution providers. Generally, the development team and implementation team for a product are different, and software integrations can be handled in different ways by different companies. The challenge remains to easily integrate these products together to provide the customer with a seamless experience so that the customer does not feel as though they are working with different products.

Traditional solutions attempt to integrate products, but the products continue to remain as individual entities. For example, some implementation teams rely on shared components between different products that allow the user interfaces or libraries of one product to be used in another product with required customizations. The final product bundles the shared components from multiple products or refers to the shared components at runtime after deployment if the products exist at the customer premise. Other implementation teams expose SDKs as a means for other products to plug into them to read or write configurations or data or even extend capabilities of the product with new features. However, leveraging SDKs for integration involves heavy coding and primarily targets information technology (IT) developers, excluding other implementers such as citizen developers and business analysts. Also, some products offer user interface (UI) configuration to allow settings to be provided by the implementation team on deployment.

However, all of these approaches put a tremendous load on implementation teams that are required to write a lot of code to integrate components between multiple products which also adds to the cost of the implementation. Additionally, most enterprise products rely on input from business/functional experts, such as business experts, and citizen developers, who are developers that are part of the customer team but may not be as technologically savvy as IT developers, before implementation reaches the coding stage, but limits these users as project input touchpoints. The present disclosure can leverage these users as part of the implementation solution which is key to speed up the implementation process.

The present disclosure provides a common visual modeler that is a unified platform with no defined product feature set but instead is built with the product features that a company has, wants, or needs. The common visual modeler encompasses customizable artifacts and is a low code approach, enabling both technical and non-technical users to build applications with little or no coding, which also lowers implementation costs. The common visual modeler also greatly reduces development efforts by avoiding the need to maintain multiple versions of a modeler. Instead, development teams need only maintain modeler components and plugins and focus on the integration of the components. Additionally, the common visual modeler is highly customizable both during development and implementation phases. The development phase allows any product to board its component model into the common visual modeler. In the implementation phase, a plugin model allows the implementation team to customize models based on business requirements.

Referring now to the drawings, FIG. 1 illustrates an environment 100 within which systems and methods for seamlessly integrating multiple products as a common layer can be implemented. The environment 100 may include a data network 110 (e.g., an Internet or a computing cloud), end user(s) 105, client device(s) 120 associated with the end user 105, and a system 200 for seamlessly integrating multiple products as a common layer. In some embodiments, end user(s) 105 may comprise IT developers who are individuals that build and create software applications and are proficient in one or more coding languages, citizen developers who are developers that are part of a customer team who may not be as technology savvy as an IT developer, and business analysts who hold the knowledge of their application but typically are not technical people. Client device(s) 120 may comprise a personal computer (PC), a desktop computer, a laptop, a smartphone, a tablet, or so forth.

The system 200 may include an application server 210 and a common visual modeler 215. The client device 120 may have a user interface 130. Furthermore, a web browser 140 may be running on the client device 120 and may be displayed using the user interface 130. The web browser 140 may communicate with the application server 210 via the data network 110.

The data network 110 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The web browser 140 may display a web page associated with a studio 150 where end user(s) 105 can build applications using different products. The web browser 140 may establish a communication channel with the application server 210 and may generate and render virtual screens based on data received from the application server 210.

The end user 105 may send a request 160 to the system 200 using the client device 120. The request 160 may include a request to deploy a component to an application. In response to the request 160, the application server 210 may load the component to the application. The application and the component may be rendered by the web browser 140.

Figure 2:
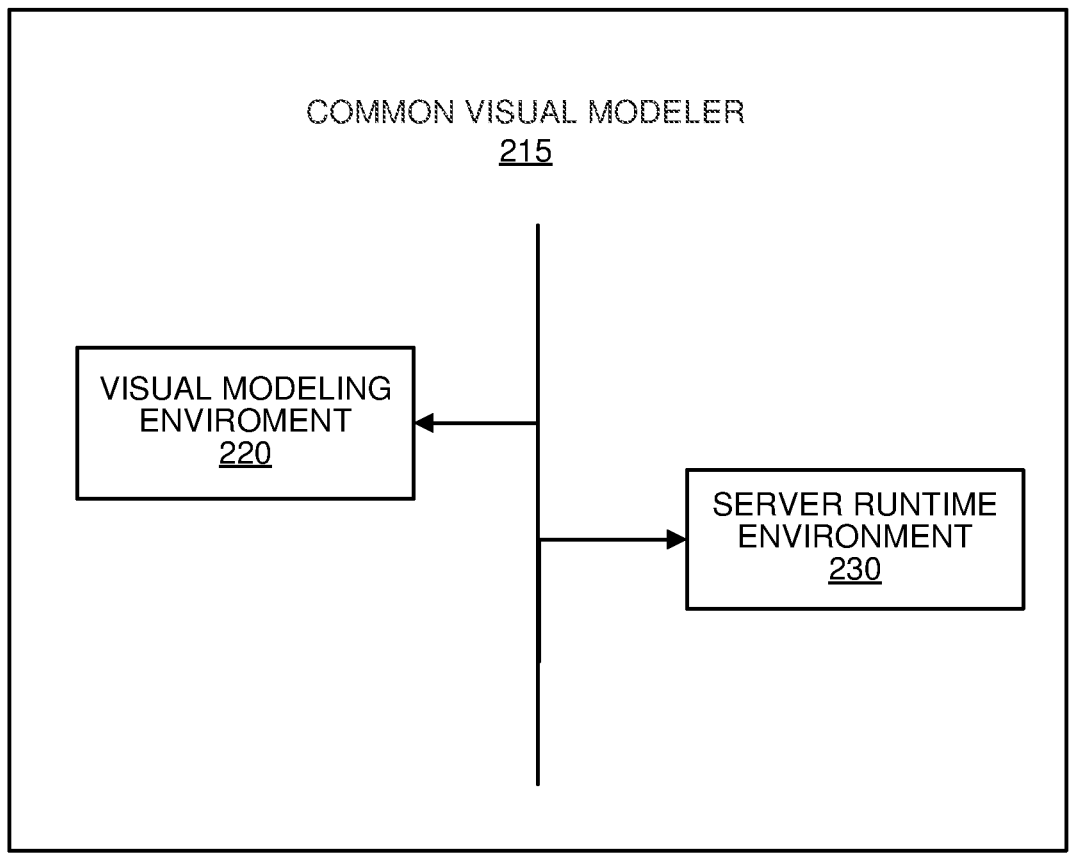
FIG. 2 is a block diagram of a common visual modeler for unifying multiple products as a common layer, according to an example embodiment.

FIG. 2 shows a block diagram illustrating various modules of a common visual modeler 215, according to an example embodiment. The common visual modeler 215 may include a visual modeling environment 220 that provides a framework to plug in different product lines of a product vendor and allows end users 105 to build applications using the different products and a server runtime environment 230 that allows the applications created in the visual modeling environment 220 to be executed or deployed in runtime.

Figure 3:
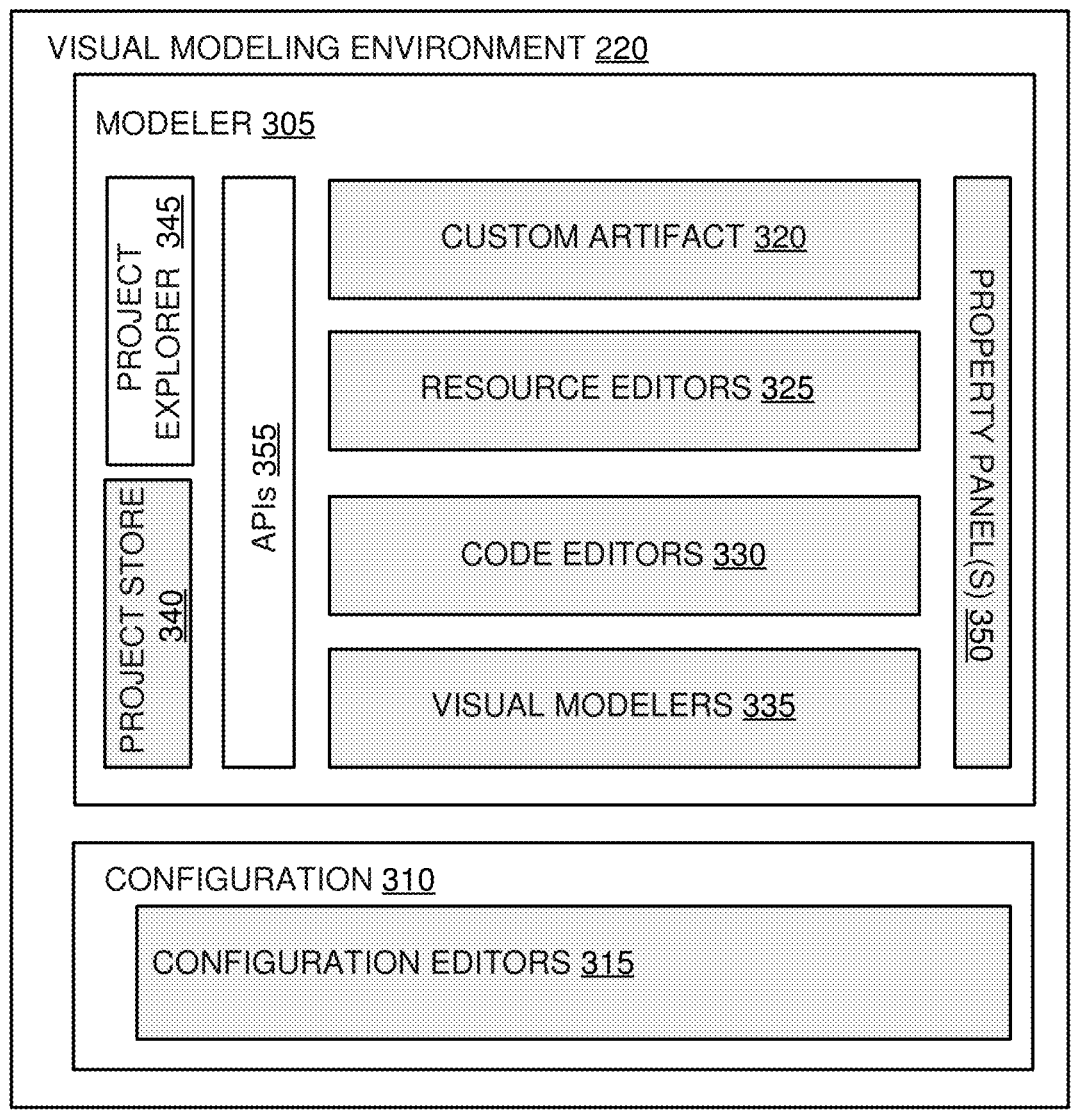
FIG. 3 is a block diagram of a visual modeling environment according to an example embodiment.

FIG. 3 shows a block diagram illustrating the various components of visual modeling environment 220. In some embodiments, the visual modeling environment 220 is a browser-based studio that allows end users 105 to build applications in a low code environment using different products and their components. The products may comprise one or more enterprise software products sold from one or more software vendors. Furthermore, a product may be comprised of one or more components or features. Visual modeling environment 220 may comprise a modeler 305 and configuration 310.

Configuration 310 allows end user 105 to create multiple types of configurations, such as users, roles, servers, connectors, and so forth using configuration editors 315.

Modeler 305 comprises a set of components that allow end user 105 to create an application. Modeler 305 may include custom artifact 320, resource editors 325, code editors 330, visual modelers 335, project store 340, project explorer 345, property panel(s) 350 and application programming interfaces (APIs) 355. In some embodiments, the components of modeler 305 come from different products.

In some embodiments, visual modelers 335 which may be user interface-based (UI-based) modeling tools such as a process modeler, a UI modeler, rule modeler, policy modeler, any custom modeler and so forth. End user 105 may use visual modelers 335 to draw a process or an application. Visual modelers 335 may be used to create different artifacts, such as custom artifact 320, for an enterprise application. Custom artifact 320 may be new or extended from any of the components within visual modeling environment 220. Custom artifact 320 may also refer to one or many configurations in configuration 310. Resource editors 325 may include properties, images, fonts, and so forth. Code editors 330 may include JavaScript, Python, .NET, and so forth.

Project explorer 345 may encompass various artifacts that belong to an application. The contents of a project can be stored in project store 340 which may include a target store, such as file, database, or cloud, and project store 340 can be configured for each artifact during the development or implementation phase.

In the development phase, development teams may create one or more modelers 305 for the components of their product and include the one or modelers in visual modeling environment 220 during a software build process through configuration 310. Each modeler 305 may contain design elements that are specific to the purpose of the application being designed. These design elements may have their own properties or configuration that end user 105 can provide values for, and the properties can be displayed in property panel(s) 350. Development teams may also add specific design elements to existing modelers 305 as they need. In some embodiments, end users 105 can plug in their own custom components in place of configuration editors 315, custom artifact 320, resource editors 325, code editors 330, visual modelers 335, project store 340, and property panel(s) 350 as seen in gray.

Figure 4:
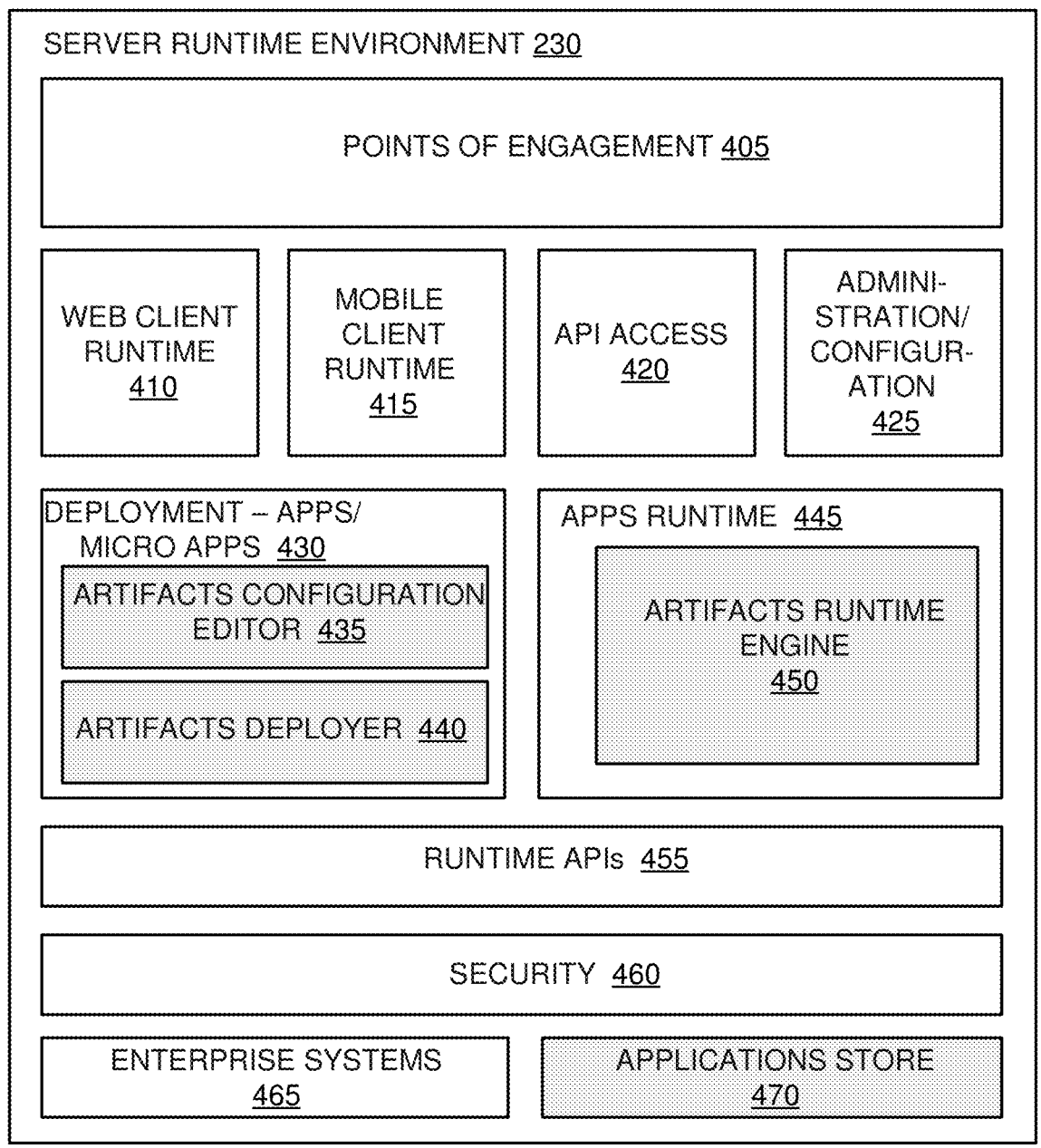
FIG. 4 a block diagram of a server runtime environment according to an example embodiment.

Referring now to FIG. 4, once applications are created in the visual modeling environment 220, server runtime environment 230 allows the applications to be executed or deployed in runtime. In some embodiments, the applications are exported as deployment archives, and the deployment archives are imported into the server runtime environment 230. Server runtime environment 230 may serve the applications to end user(s) 105.

Server runtime environment 230 may include points of engagement 405, web client runtime 410, mobile client runtime 415, API access 420, administration/configuration 425, application or micro application deployment 430, application runtime 445, runtime APIs 455, security 460, enterprise systems 465, and application store 470. Application or micro application deployment 430 may include artifacts configuration editor 435 and artifacts deployer 440. Application runtime 445 may include an artifacts runtime engine 450.

Each application developed should be capable of running in multiple points of engagement 405 which are human interaction points for the users of the application. In some embodiments, points of engagement 405 include a desktop computer, laptop, mobile devices, smart phones, tablet, a kiosk, web browsers, mobile applications, and API clients. For example, a bank may have a customer experience application such that a bank's customer should be able to input her balance or open an account from a kiosk point of engagement. The applications modeled in common visual modeler 215 should be able to run on multiple points of engagement because of their responsive design out of the box and consistent application user interfaces. In some embodiments, points of engagement 405 may be moved out of server runtime environment 230 since points of engagement 405 belong to the users of the application.

Administration/configuration 425 collects management interfaces, allowing products to have configurations, such as organization, context, license, and so forth, maintained. In some embodiments, artifacts that are part of applications built on modeler 305 require deployment strategy in runtime. In application or micro application deployment 430, artifacts deployer 440 supplies a deployment handler for each artifact type a product component handles. For example, a visual modeler 335, such as a policy modeler, allows an end user 105 to create a policy with a set of rules, and upon deployment, the rules may be stored in a database, cloud, or into another rule engine.

Furthermore, each artifact may have a runtime handler that knows how to work with the artifact. For example, a visual modeler 335, such as a policy modeler, allows an end user 105 to create a policy with a set of rules or requirements. In runtime, an artifacts runtime engine 450, such as a policy engine, reads the policy that end user 105 has defined and executes the rules against values that are dynamically passed. In some embodiments, artifacts runtime engine 450 may be a process engine, UI engine, rule engine, and so forth.

Server runtime environment 230 handles security 460, and exposes runtime APIs 455. Enterprise applications consume data from or transact into various systems as part of their execution. Each artifact designed in modeler 305 may integrate into one or many enterprise systems, such as a repository, an active directory, a database, applications, and so forth, in its lifecycle in the application. Applications store 470 may include a file, database, cloud, and so forth. In some embodiments, end users 105, such as developers on product teams, can plug in their own custom components in place of artifacts configuration editors 435, artifacts deployer 440, artifacts runtime engine 450, and applications store 470 as seen in gray.

Figure 5:
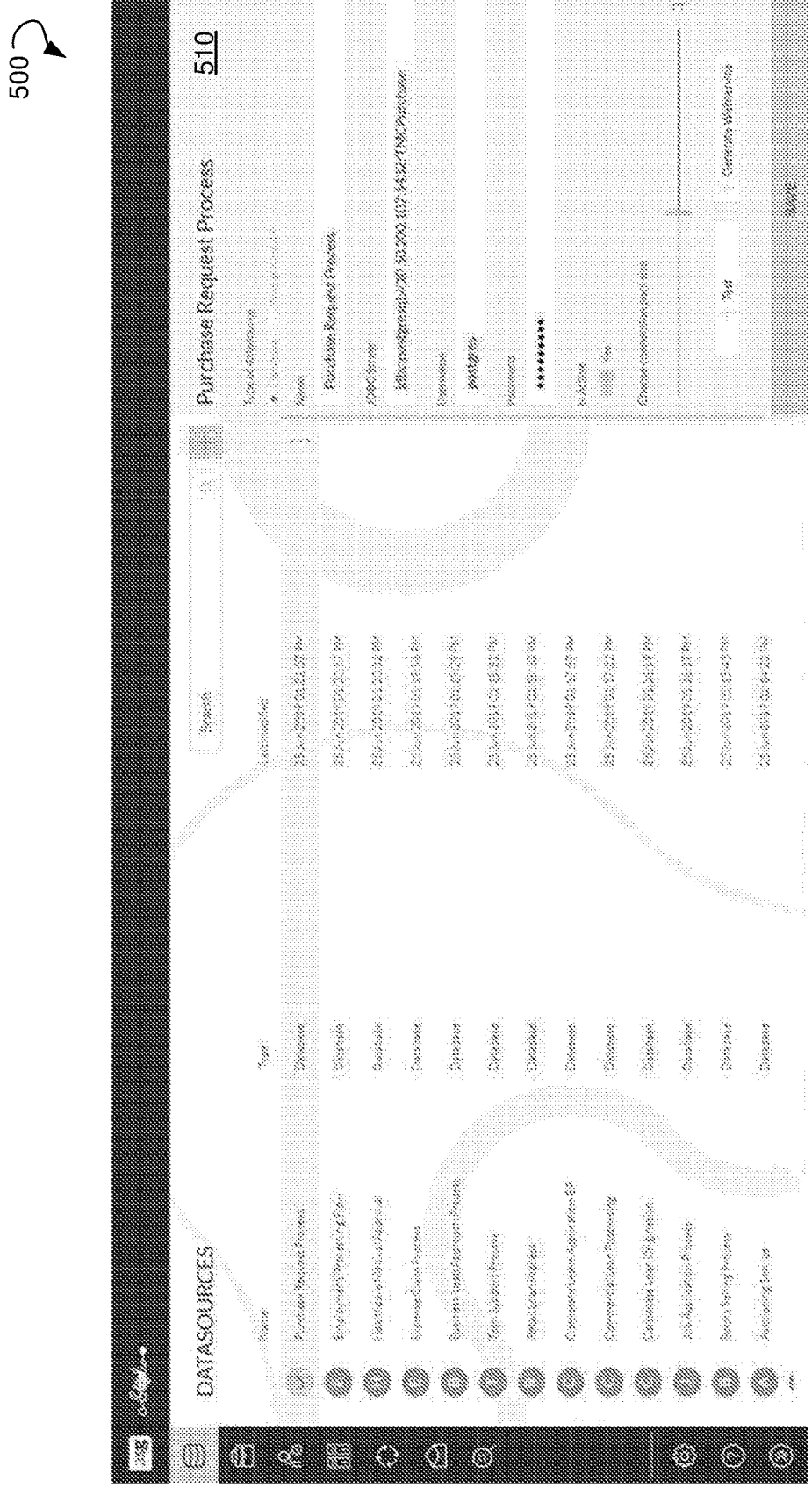
FIG. 5 is a screenshot illustrating an exemplary configuration of datasources within a common visual modeler.

FIG. 5 depicts an exemplary screenshot 500 of a visual modeling environment 220 of common visual modeler 215. The visual modeling environment 220 is viewable in web browser 140. In some embodiments, the visual modeling environment 220 is a downloadable component. FIG. 5 depicts a list of datasources that are the base unit of any application to be created where data is taken from a specific source or transferred into a specific source. In some embodiments, the type of datasource includes a database, a web service API, a content repository, and any other data source. The configuration properties 510 of a datasource may be configured for an enterprise through a form in visual modeling environment 220 without any coding. In runtime, the selected datasource is connected to and connections should write some information into the datasource or read information out of the datasource. In some embodiments, the connection to the selected datasource is implemented in artifacts runtime engine 450.

Typically, when building an application, datasources are coded to specific frameworks such as Java, Spring Framework, or .NET. However, in common visual modeler 215, multiple datasources can be seamlessly integrated. If a company buys a new product, either from a same vendor or a different vendor, a new datasource can be seamlessly added to the list of datasources both at the development side or the implementation side.

Figure 6:
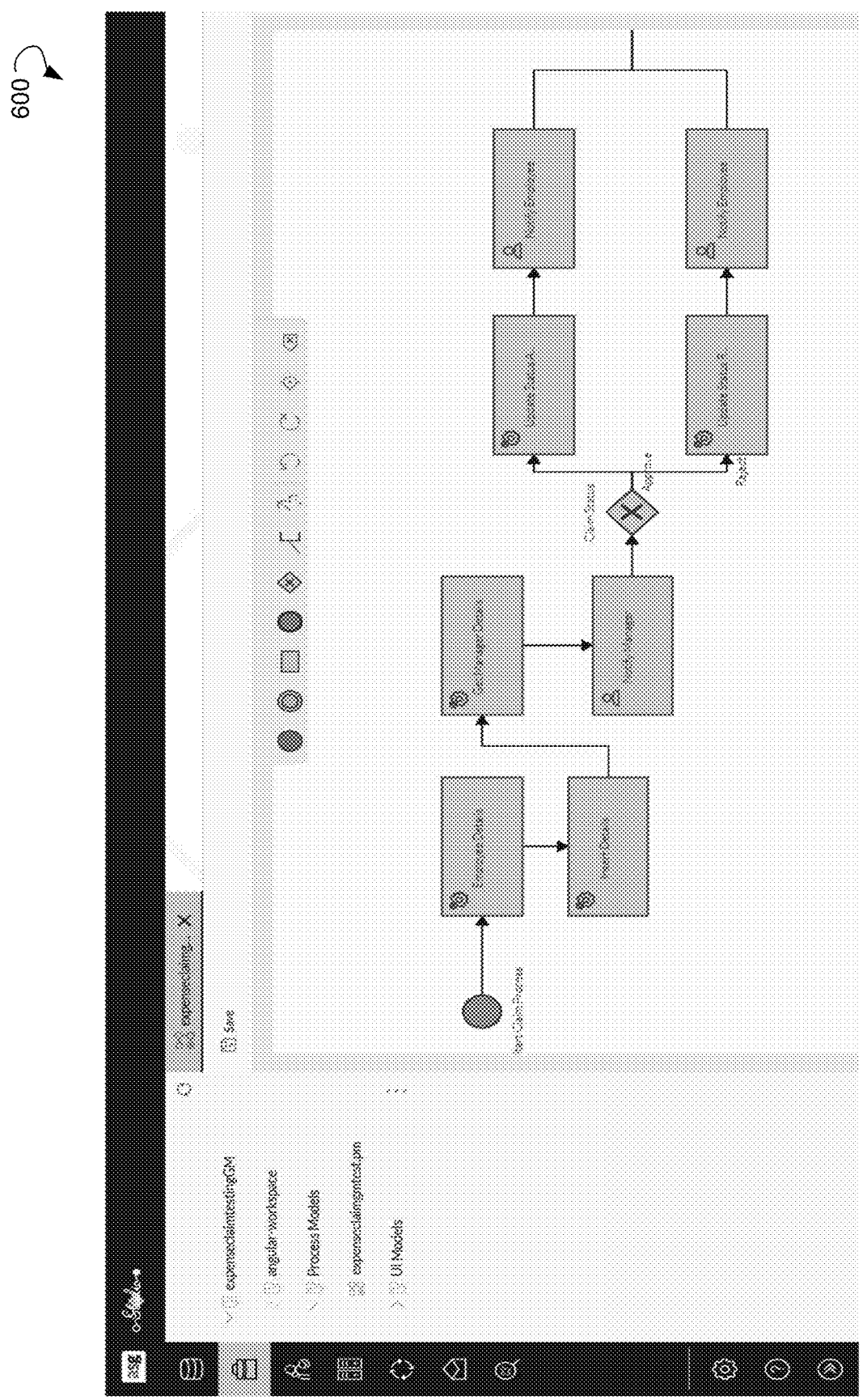
FIG. 6 is a screenshot illustrating an exemplary process modeler.

FIG. 6 depicts an exemplary screenshot 600 of a project within visual modeling environment 220 of common visual modeler 215. Within the project, a process modeler, which is a type of visual modeler 335, is depicted. Using the process modeler, end user 105 can visually create and configure one or more business processes end to end. For example as depicted, a small business process may have a start, a user, and an end element. Another example may be that end user 105 needs to have a repository so that whenever a user of an application upload a check as part of a bank process, the check is saved in the repository if the upload was successful. By using the process modeler, end user 105 is able to visually model this process for the application without having to code any of the process.

Another type of visual modeler 335 is a UI modeler that can create user interfaces. User interfaces tend to vary between different products. For example, for a business process management product, a user interface of a form where information can be filled in and submitted may be sufficient. However, with business intelligence and data intelligence products, a graph may need to be added to the UI. By using the UI modeler, end user 105 can integrate these requirements to produce a meaningful application. Furthermore, the UI modeler may be customized with additional UI controls as a business requires.

Figure 7:
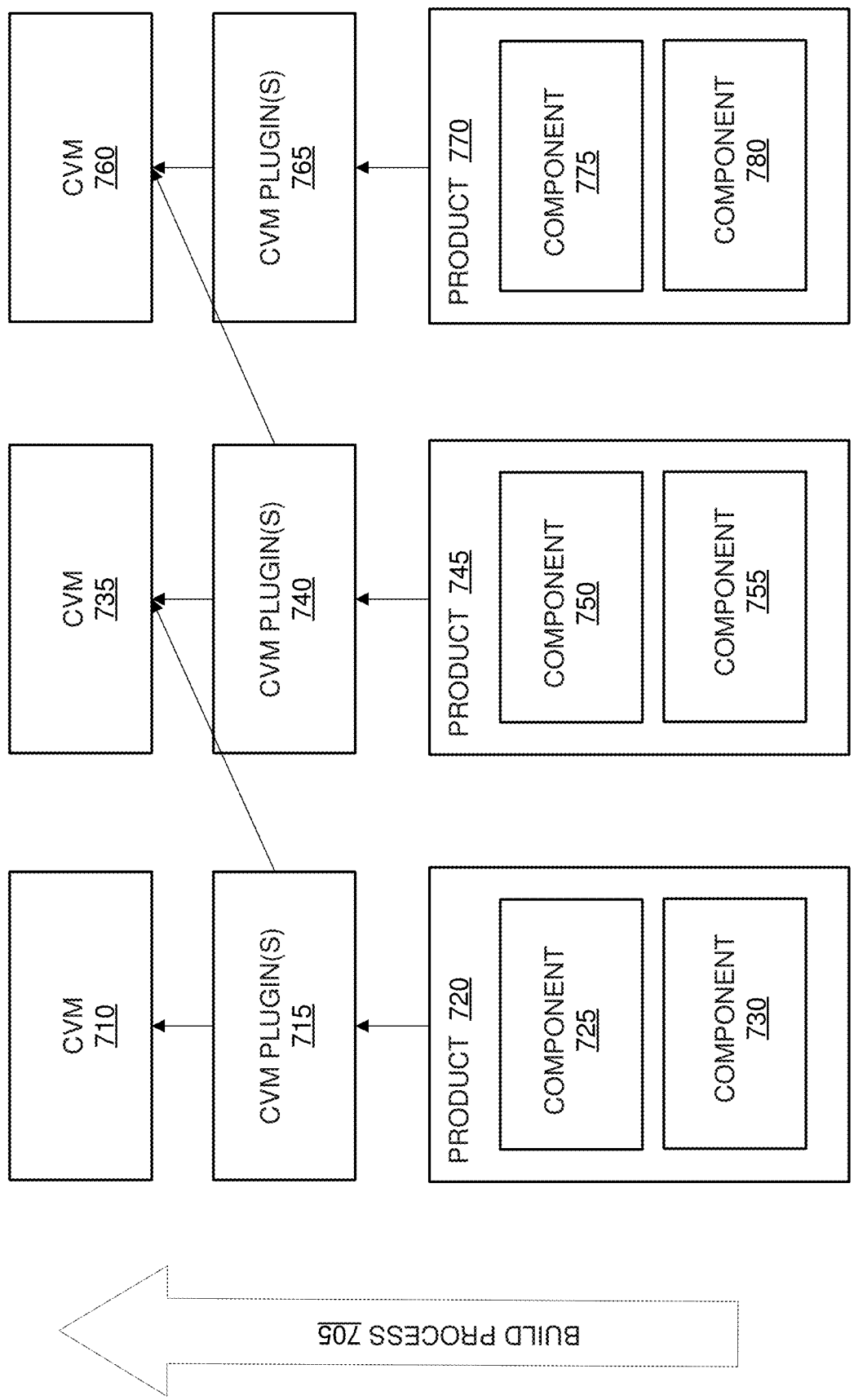
FIG. 7 illustrates a diagram of a build process of common visual modelers according to an example embodiment.

FIG. 7 shows a diagram of build process 705 for various common visual modelers 710, 735, and 760. Different products have their own SDKs, their own set of user interfaces, and they generally provide documentation and sample programs for implementation teams who want to repurpose the product. A company customer relies on its implementation team to use the SDKs, write code, deploy it, and make the application ready. However, if a new product is sold to the company customer, the same process needs to be repeated again, and the different products tend to remain as individual or independent products.

FIG. 7 depicts multiple products 720, 745, and 770. Each product 720, 745, and 770 wants to load into a common visual modeler so they make a set of plugins 715, 740, and 765, respectively. If a first company customer only needs product 720 comprising components 725 and 730, product 720 is loaded into common visual modeler 710 through plugin 715. If a second company customer purchases product 720, comprising components 725 and 730, and product 745, comprising components 750 and 755, and wants to build an application that contains features from both products 720 and 745, another common visual modeler 735 will be built that includes the components of both products 720 and 745. If a third company customer purchases product 745, comprising components 750 and 755, and product 770, comprising components 775 and 780, and wants to build an application that contains features from both products 745 and 770, another common visual modeler 760 will be built that includes the components of both products 745 and 770.

Any combination of products and components can be created by running the build process 705 and upgrading the company customer to a new common visual modeler where the new components will be available for application building.

In another embodiment, if a company customer comes up with a new requirement which a product currently does not address, in runtime after the common visual modeler is built and delivered the company customer, the implementation team can add new plugins and new components of the products to the common visual modeler. For example, end user 105 has a UI modeler that has set of controls including input, select box, combo box, check box, and a table. However, end user 105 needs a chart to be part of his list of controls. End user 105 can use a visual modeler to create a component that meets his needs, plug in the component to the common visual modeler, and even reuse the component for another project.

Figure 8:
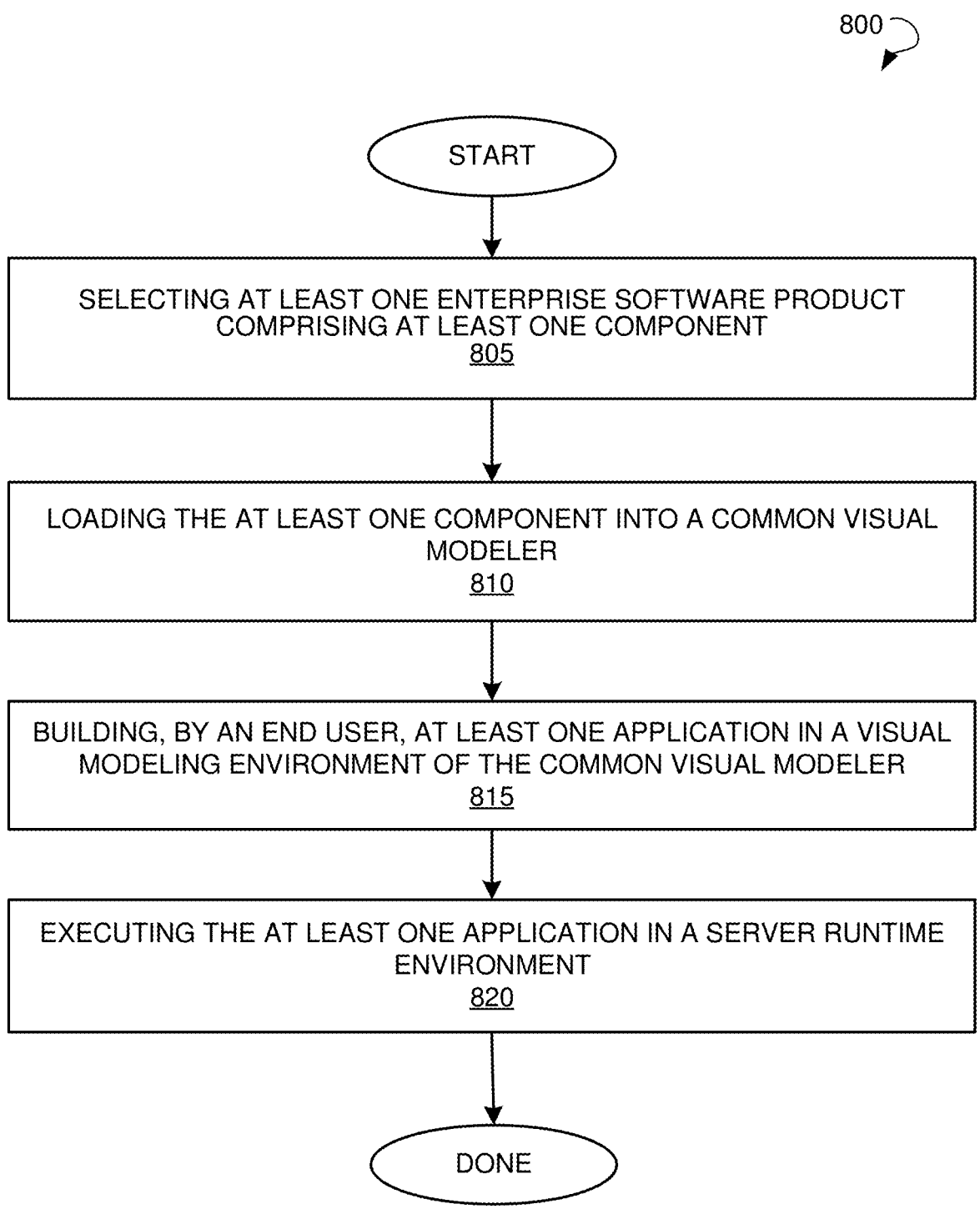
FIG. 8 illustrates a flow chart of a method for seamlessly integrating multiple products as a common layer by using a common visual modeler, according to an example embodiment.

FIG. 8 shows a process flow diagram of a method 800 for seamlessly integrating multiple products as a common layer by using a common visual modeler, according to an example embodiment. In some embodiments, the operations may be combined, performed in parallel, or performed in a different order. The method 800 may also include additional or fewer operations than those illustrated. The method 800 may be performed by processing logic that may comprise hardware (e.g., decision making logic, dedicated logic, programmable logic, and microcode), software (such as software run on a general-purpose computer system or a dedicated machine), or a combination of both.

The method 800 may commence with selecting at least one enterprise software product comprising at least one component at operation 805. The method 800 may continue with loading the at least one component into a common visual modeler at operation 810. The method 800 may further include building, by an end user, at least one application in a visual modeling environment of the common visual modeler, the building at operation 815.

In some embodiments, the building of the at least one application may include using at least one UI-based modeling tool of a modeler to create at least one artifact. The building of the at least one application may further include configuring and managing settings of the at least one component by a configuration module.

The method 800 may further include executing the at least one application in a server runtime environment at operation 820. In some embodiments, the executing the at least one application in a server runtime environment may be for the at least one artifact created by the modeler.

Figure 9:
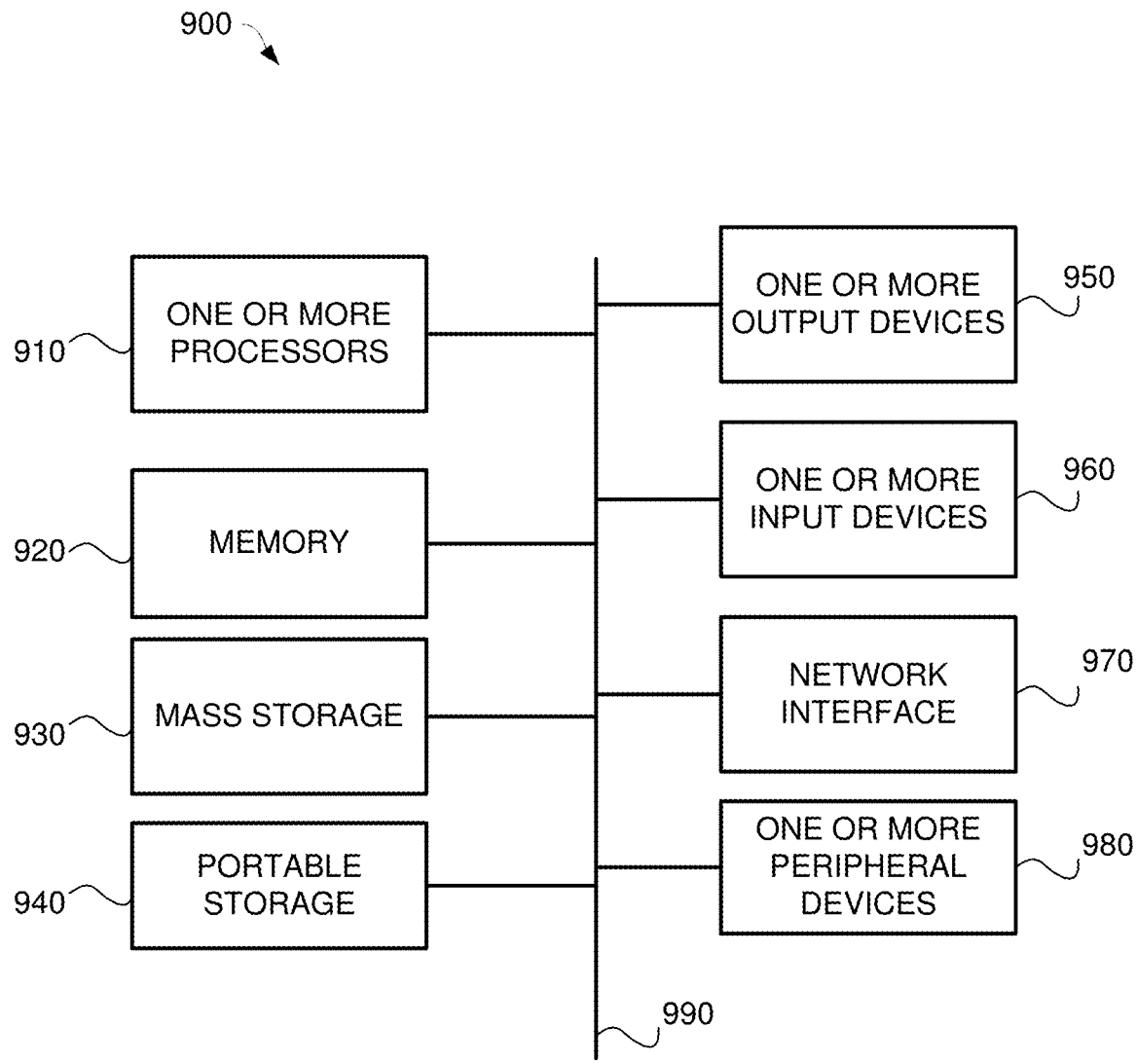
FIG. 9 is a computing system that can be used to implement a method for seamlessly integrating multiple products as a common layer by using a common visual modeler, according to an example embodiment.

FIG. 9 illustrates an exemplary computing system 900 that may be used to implement embodiments described herein. The exemplary computing system 900 of FIG. 9 may include one or more processors 910 and memory 920. Memory 920 may store, in part, instructions and data for execution by the one or more processors 910. Memory 920 can store the executable code when the exemplary computing system 900 is in operation. The exemplary computing system 900 of FIG. 9 may further include a mass storage 930, portable storage 940, one or more output devices 950, one or more input devices 960, a network interface 970, and one or more peripheral devices 980.

The components shown in FIG. 9 are depicted as being connected via a single bus 990. The components may be connected through one or more data transport means. The one or more processors 910 and memory 920 may be connected via a local microprocessor bus, and the mass storage 930, one or more peripheral devices 980, portable storage 940, and network interface 970 may be connected via one or more input/output buses.

Mass storage 930, which may be implemented with a magnetic disk drive or an optical disk drive, is a non-volatile storage device for storing data and instructions for use by a magnetic disk or an optical disk drive, which in turn may be used by one or more processors 910. Mass storage 930 can store the system software for implementing embodiments described herein for purposes of loading that software into memory 920.

Portable storage 940 may operate in conjunction with a portable non-volatile storage medium, such as a compact disk (CD) or digital video disc (DVD), to input and output data and code to and from the computing system 900 of FIG. 9. The system software for implementing embodiments described herein may be stored on such a portable medium and input to the computing system 900 via the portable storage 940.

One or more input devices 960 provide a portion of a user interface. The one or more input devices 960 may include an alphanumeric keypad, such as a keyboard, for inputting alphanumeric and other information, or a pointing device, such as a mouse, a trackball, a stylus, or cursor direction keys. Additionally, the computing system 900 as shown in FIG. 9 includes one or more output devices 950. Suitable one or more output devices 950 include speakers, printers, network interfaces, and monitors.

Network interface 970 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 970 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 980 may include any type of computer support device to add additional functionality to the computing system. The one or more peripheral devices 980 may include a modem or a router.

The components contained in the exemplary computing system 900 of FIG. 9 are those typically found in computing systems that may be suitable for use with embodiments described herein and are intended to represent a broad category of such computer components that are well known in the art. Thus, the exemplary computing system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, various embodiments of methods and systems for enabling seamless integration between multiple products as a common layer by using a common visual modeler have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A system comprising:
   an application server, the application server configured for loading a component from an enterprise software product to at least one application in response to a request to deploy the component to the at least one application; and
   a common visual modeler, the common visual modeler comprising customizable configurations associated with the system, the common visual modeler being customizable during both a development phase and an implementation phase associated with the system, wherein during the development phase different enterprise software products load components from the different enterprise software products into the common visual modeler and one or more modelers associated with the components are created and included in a visual modeling environment, and wherein during the implementation phase a project store within the visual modeling environment is configured for each customizable configuration, the common visual modeler comprising:
   the visual modeling environment for building the at least one application by an end user of the system, the visual modeling environment comprising:
      a modeler of the one or more modelers for building the at least one application, wherein the modeler contains design properties provided by the end user that are specific to the at least one application and utilizes the components from the different enterprise software products in the building of the at least one application, the modeler configured as a user interface-based (UI-based) modeling tool, wherein plugins designed for the common visual modeler are provided from each of the different enterprise software products, wherein each of the provided plugins contain at least two desired components from the different enterprise software products, and wherein the at least two desired components are based on requirements of the end user, the UI-based modeling tool comprising:
         a process modeler, the process modeler enabling the end user to visually create and configure one or more business processes end to end;
         a rule modeler;
         a policy modeler, the policy modeler enabling the end user to create a policy with the requirements of the end user;
         a UI modeler for creating at least one user interface including a set of controls comprising at least one input, at least one select box, at least one combo box, at least one check box, at least one table, at least one chart, and at least one graph; and
         configuration editors, the configuration editors allowing the end user to create multiple types of the customizable configurations for the at least one application, wherein the end user utilizes the UI-based modeling tool to create a custom component that can be used in place of the configuration editors; and
   a server runtime environment for executing the at least one application, the server runtime environment comprising an administration configuration module configured to maintain licenses for the different enterprise software products, at least one runtime engine and a policy engine that reads the policy created by the end user.

2. The system of claim 1, wherein the UI-based modeling tool further comprises a custom modeler.

3. The system of claim 1, wherein the different enterprise software products are created by a single product vendor or different product vendors.

4. The system of claim 1, wherein the end user is one or more of the following:
   an information technology (IT) developer, a citizen developer, and a business analyst.

5. The system of claim 1, wherein customizations can be added to the components from the different enterprise software products during the implementation phase or the development phase.

6. The system of claim 1, wherein the different enterprise software products are created by different companies.

7. The system of claim 1, wherein the server runtime environment further comprises a plurality of points of engagement for which the at least one application is deployed, and wherein the plurality of points of engagement is two or more of the following: a desktop computer, a laptop, a mobile phone, a tablet, and a kiosk.

8. A method comprising:
   loading a component from an enterprise software product to at least one application in response to a request to deploy the component to the at least one application;
   customizing a common visual modeler during both a development phase and an implementation phase associated with a system, the common visual modeler comprising customizable configurations associated with the system, wherein during the development phase different enterprise software products load components from the different enterprise software products into the common visual modeler and one or more modelers associated with the components are created and included in a visual modeling environment, wherein during the implementation phase a project store within the visual modeling environment is configured for each customizable configuration, and wherein the common visual modeler comprises the visual modeling environment and a modeler of the one or more modelers;
   building, utilizing the modeler of the visual modeling environment, at least one application by an end user of the system, wherein the modeler contains design properties provided by the end user that are specific to the at least one application and utilizes the components from the different enterprise software products in the building of the at least one application, the modeler configured as a user interface-based (UI-based) modeling tool, wherein plugins designed for the common visual modeler are provided from each of the different enterprise software products, wherein each of the provided plugins contain at least two desired components from the different enterprise software products, and wherein the at least two desired components are based on requirements of the end user, the UI-based modeling tool comprising:
- a process modeler, the process modeler enabling the end user to visually create and configure one or more business processes end to end;
- a rule modeler;
- a policy modeler, the policy modeler enabling the end user to create a policy with the requirements of the end user;
- a UI modeler for creating at least one user interface including a set of controls comprising at least one input, at least one select box, at least one combo box, at least one check box, at least one table, at least one chart, and at least one graph; and
- configuration editors, the configuration editors allowing the end user to create multiple types of the customizable configurations for the at least one application, wherein the end user utilizes the UI-based modeling tool to create a custom component that can be used in place of the configuration editors; and executing, by a server runtime environment, the at least one application, the server runtime environment comprising an administration configuration module configured to maintain licenses for the different enterprise software products, at least one runtime engine, and a policy engine that reads the policy created by the end user.

9. The method of claim 8, wherein the different enterprise software products are created by different companies.

10. The method of claim 8, wherein the end user is one or more of the following: an information technology (IT) developer, a citizen developer, and a business analyst.

11. The method of claim 8, wherein the server runtime environment further comprises a plurality of points of engagement for which the at least one application is deployed.

12. The method of claim 11, wherein the plurality of points of engagement is two or more of the following: a desktop computer, a laptop, a mobile phone, a tablet, and a kiosk.

13. The method of claim 8, wherein the at least one runtime engine is one or more of the following: a process engine, a UI engine, a rule engine, and a policy engine.

14. A computer program product comprising a non-transitory computer useable storage device having a computer readable program, the computer readable program when executed on a server computing device causes the server computing device to:
- load a component from an enterprise software product to at least one application in response to a request to deploy the component to the at least one application;
- customize a common visual modeler during both a development phase and an implementation phase associated with a system, the common visual modeler comprising customizable configurations associated with the system, wherein during the development phase different enterprise software products load components from the different enterprise software products into the common visual modeler and one or more modelers associated with the components are created and included in a visual modeling environment, wherein during the implementation phase a project store within the visual modeling environment is configured for each customizable configuration, and wherein the common visual modeler comprises the visual modeling environment and a modeler of the one or more modelers;
- build, utilizing the modeler of the visual modeling environment, at least one application by an end user of the system, wherein the modeler contains design properties provided by the end user that are specific to the at least one application and utilizes the components from the different enterprise software products in the building of the at least one application, the modeler configured as a user interface-based (UI-based) modeling tool, wherein plugins designed for the common visual modeler are provided from each of the different enterprise software products, wherein each of the provided plugins contain at least two desired components from the different enterprise software products, and wherein the at least two desired components are based on requirements of the end user, the UI-based modeling tool comprising:
  - a process modeler, the process modeler enabling the end user to visually create and configure one or more business processes end to end;
  - a rule modeler;
  - a policy modeler, the policy modeler enabling the end user to create a policy with the requirements of the end user;
  - a UI modeler for creating at least one user interface including a set of controls comprising at least one input, at least one select box, at least one combo box, at least one check box, at least one table, at least one chart, and at least one graph; and
  - configuration editors, the configuration editors allowing the end user to create multiple types of the customizable configurations for the at least one application, wherein the end user utilizes the UI-based modeling tool to create a custom component that can be used in place of the configuration editors; and
- execute, by a server runtime environment, the at least one application, the server runtime environment comprising an administration configuration module configured to maintain licenses for the different enterprise software products, at least one runtime engine, and a policy engine that reads the policy created by the end user.

15. The computer program product of claim 14, wherein customizations are added to the components from the different enterprise software products during the implementation phase.

16. The computer program product of claim 14, wherein the UI-based modeling tool further comprises a custom modeler.

17. The computer program product of claim 14, wherein the different enterprise software products are created by a single product vendor or different product vendors.

18. The computer program product of claim 14, wherein the end user is one or more of the following: an information technology (IT) developer, a citizen developer, and a business analyst.

19. The computer program product of claim 14, wherein the server runtime environment further comprises a plurality of points of engagement for which the at least one application is deployed, and wherein the plurality of points of engagement is two or more of the following: a desktop computer, a laptop, a mobile phone, a tablet, and a kiosk.

20. The computer program product of claim 14, wherein the at least one runtime engine is one or more of the following: a process engine, a UI engine, a rule engine, and a policy engine.

* * * * *